(12) United States Patent
Uriya

(10) Patent No.: US 6,574,489 B1
(45) Date of Patent: Jun. 3, 2003

(54) INCOMING CALL NOTIFICATION METHOD AND DEVICE FOR A MULTIMODE RADIO DEVICE

(75) Inventor: Susumu Uriya, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/339,205

(22) Filed: Jun. 24, 1999

(30) Foreign Application Priority Data

Jun. 26, 1998 (JP) .......................................... 10-181061

(51) Int. Cl.⁷ ................................................ H04B 1/38
(52) U.S. Cl. ........................ 455/567; 455/526; 455/552; 455/553; 340/7.58; 340/7.59; 340/7.6; 340/7.61; 340/7.62
(58) Field of Search ................................ 455/426, 552, 455/553, 567; 340/7.58, 7.59, 7.6, 7.61, 7.62

(56) References Cited

U.S. PATENT DOCUMENTS

| | | | | |
|---|---|---|---|---|
| 5,127,042 A | * | 6/1992 | Gillig | 455/550 |
| 5,317,622 A | * | 5/1994 | Shinozaki | 379/58 |
| 5,884,188 A | * | 3/1999 | Hayes, Jr. | 455/552 |
| 6,160,489 A | * | 12/2000 | Perry et al. | 340/825 |
| 6,192,239 B1 | * | 2/2001 | Lee et al. | 455/425 |

FOREIGN PATENT DOCUMENTS

| | | |
|---|---|---|
| JP | 6-284464 | 10/1994 |
| JP | 7-111680 | 4/1995 |
| JP | 7-298339 | 11/1995 |
| JP | 9-266592 | 10/1997 |

\* cited by examiner

*Primary Examiner*—Lee Nguyen
*Assistant Examiner*—Danh Le
(74) *Attorney, Agent, or Firm*—Sughrue Mion, PLLC

(57) ABSTRACT

A multimode radio has: an antenna that transmits and receives calls via radio signals of a plurality of communication modes; receivers that convert the received radio signals to signals for particular communication modes; an incoming call notifying unit having a speaker, display, or vibrator that respectively output a different sound, display content, or vibration according to the current communication mode; and a control unit that controls operations, detects the receiver that has received a call signal, and controls the incoming call notifying unit according to the communication mode set in a currently active receiver. Different notification methods are preassigned for the different communication modes, and when an incoming call to the address of the multimode radio is detected, the communication mode of the detected call is identified and a user is notified of the call by the notification method that corresponds to the identified communication mode.

20 Claims, 14 Drawing Sheets

INCOMING CALL NOTIFICATION METHOD AND DEVICE FOR A MULTIMODE RADIO DEVICE

BACKGROUND OF THE INVENTION

1. Field of the Invention

The present invention relates to a multimode radio device that can be used in a radio system having a plurality of different communication modes, and particularly to an incoming call notification method and device in a multimode radio device.

2. Description of the Related Art

Recently, multimode radio devices have been developed as disclosed in, for example, Japanese Patent Laid-open No. 284464/94, Japanese Patent Laid-open No. 298339/95, and Japanese Patent Laid-open No. 266592/97, in which transmitter/receivers of several different radio systems are combined in one radio device and in which the mode of one of these communication systems can be selected and used as appropriate.

Japanese Patent Laid-open No. 111680/95 discloses one example of a multimode radio unit that can distinguish the communication mode that is in use.

This radio unit is proposed with the object of enabling a user to identify the communication mode at the time of call origination, and as shown in FIG. 6, is made up of: cellular telephone radio unit 201 that modulates and demodulates radio signals of a cellular telephone; cordless telephone radio unit 202 that modulates and demodulates radio signals of a cordless telephone; microphone 203 for receiving speech; speaker 204 for outputting speech; speech processor 205 that is connected to the above-described cellular telephone radio unit 201, cordless telephone radio unit 202, microphone 203, and speaker 204, for processing each of the speech signals; operation panel 206 for receiving operation commands from the outside; display 207 for displaying the operating state; cellular mode keypad depressing sound generator 208a for use with the cellular telephone and cordless mode keypad depressing sound generator 208b for use with the cordless telephone, each for generating differing sounds each time a key is depressed depending on the mode in use for dial signals received from operation panel 206; mode detector 210 for detecting the mode in current use; and controller 209 for overall control of the unit.

In the multimode portable radio unit having the above-described construction, the keypad depressing sound that is generated when calling differs depending on the communication mode that is being used and thus notifies the user of the communication mode that is currently in use.

In the multimode mobile radio unit of the above-described prior art, however, there is the problem that when an incoming call is detected, a call incoming tone is outputted or a vibrator activated in accordance with the one preset means, regardless of the radio system by which the radio signals were transmitted, and a user is therefore unable to identify which mobile radio system produced the radio signals of the detected incoming call.

The device described in Japanese Patent Laid-open No. 111680/95 notifies the user of the communication mode that was used when calling, but does not notify at call incoming which mobile radio system produced the radio signals of the incoming call.

Knowing which radio communication system produced the radio signals upon call incoming, however, is necessary for inferring a caller's identity or for judging what action to take when responding, for example, whether to stop or continue moving if the call originated from a mobile radio device.

SUMMARY OF THE INVENTION

In view of the above-described problems of the prior art, it is an object of the present invention to provide a multimode radio device call incoming notification method and call incoming notifying device that can identify which type of radio system radio signals an incoming call belongs to upon call incoming in a multimode radio device.

To realize the above-described object, the call incoming notification method of the multimode radio device of this invention: sets in advance a different call incoming notification method for each of a set plurality of communication modes, detects an incoming call by radio signals to its own address, identifies the communication mode in which the incoming call was detected, and notifies of call incoming by the call incoming notification method that corresponds to the identified communication mode.

The incoming call notifying device of a multimode radio device of this invention is provided with: an antenna for transmitting and receiving radio signals of a prescribed plurality of communication modes; a plurality of receivers for converting radio signals received by the antenna to signals for each independently established communication mode and outputting the result; an incoming call notifying unit including a plurality of expressing means that distinguish and express each of the communication modes, for reporting, by means of the expressing means corresponding to the communication mode, that a call signal to the address of the multimode radio device has been received; and a control unit for controlling the operation of the plurality of receivers and incoming call notifying unit, detecting the receiver that has received a call signal, and controlling the expressing means of the incoming call notifying unit in accordance with the communication mode set in the receiver.

In addition, the control unit may also switch the operations of each of the plurality of receivers at a predetermined timing and switch the communication modes of the expressing means of the incoming call notifying units in synchronization with the timing of receiver switching; or may set the incoming call notifying unit to the mode for each communication system after the passage of a fixed time interval after switching the operations of the plurality of receivers.

The control unit can control the expressing means of the incoming call notifying unit based on the mode setting information of radio signals received by way of the antenna.

The expressing means of the incoming call notifying unit can be a speaker that outputs, for each communication system, different incoming call sounds, for example, different patterns of stops and starts, or incoming call sounds of different sound volumes.

The expressing means of the incoming call notifying unit may also be a display that displays the incoming call state by different character strings or images for each communication system.

The expressing means of the incoming call notifying unit may also be a vibrator that generates vibrations of different amplitude, of different stop-and-start patterns, or of different rpm, for each communication system.

When a call addressed to the multimode radio device is detected, the present invention constructed as described hereinabove outputs particular incoming call information for the communication system in the call occurred, and a user therefore can recognize which radio system produced the a call at the time of call incoming.

Accordingly, when the radio device is a mobile communication system, the user can know which mobile communication system service area his unit is in, and therefore can judge whether movement is subsequently possible or not or, if currently in motion, whether or not movement should stop at that point.

Finally, the switching of incoming call information for each communication system can be made synchronous with switching of the operation of receivers or can be executed based on received radio signals. However, switching of incoming call information after the passage of a fixed time interval following switching of the operation of the receiver allows the operation of the receiver to stabilize and has the merit of preventing malfunction of the receivers and notifying units.

The above and other objects, features, and advantages of the present invention will become apparent from the following description referring to the accompanying drawings, which illustrate examples of preferred embodiments of the present invention.

DETAILED DESCRIPTION OF THE PREFERRED EMBODIMENTS

Figure 1:
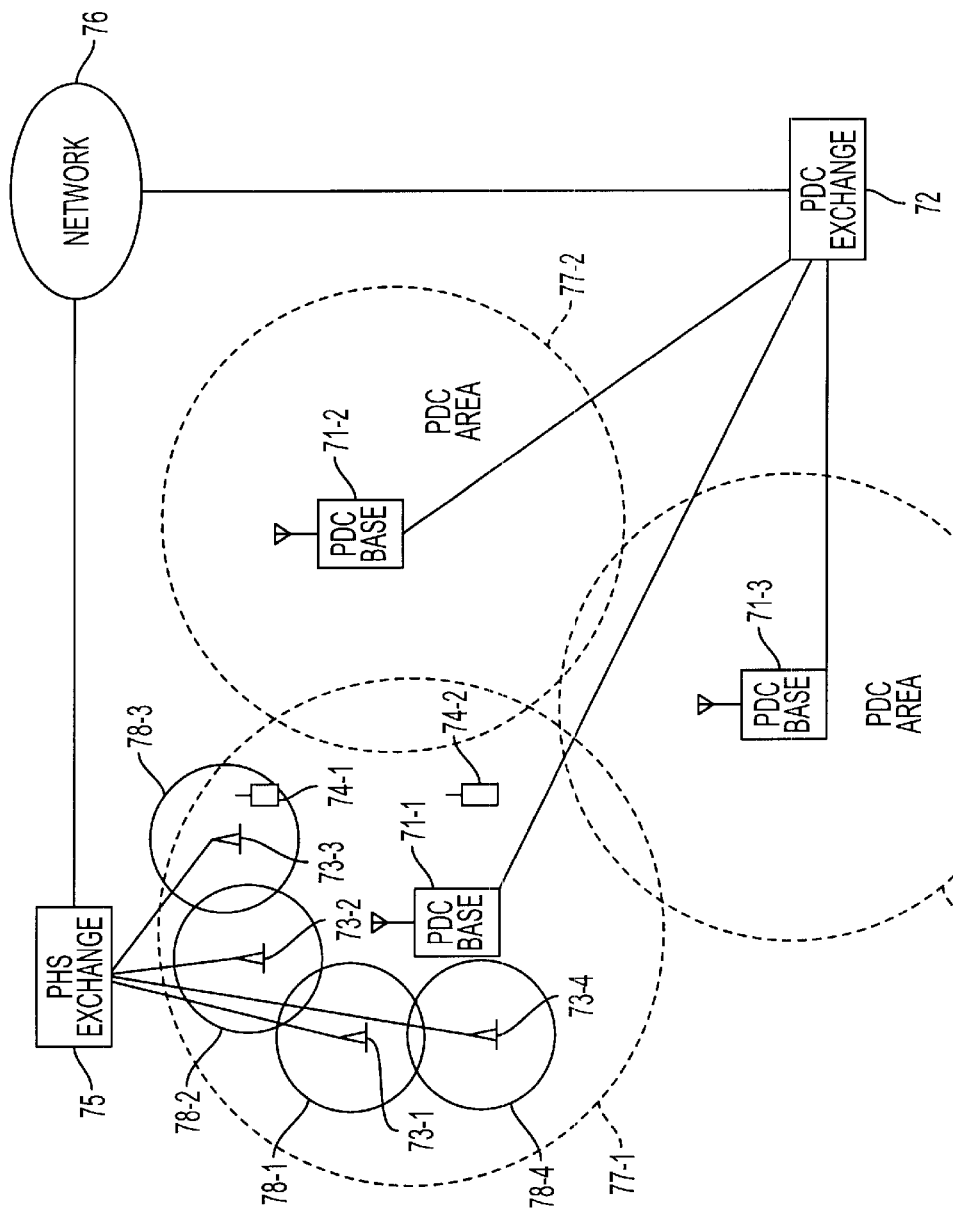
FIG. 1 shows the areas in which two different radio communication systems, a PDC system and PHS, are combined.

To describe the use of one of the multimode radio devices, FIG. 1 shows an area in which a PDC (Personal Digital Cellular) system and a PHS (Personal Handy-Phone System) are mixed.

In FIG. 1, the constituent elements of this area include: mobile radio units 74-1 and 74-2 that can be used in the communication modes of both a PDC system and a PHS (only two mobile radio units are shown in the figure); a plurality of PDC base stations 71-1-71-3 by which mobile radio units 74-1 and 74-2 are connected by way of the radio lines of a PDC system (only three base stations are shown in the figure); PDC exchange 72 that is connected between PDC base stations 73-1-73-3 and network 76 and that both switches connections between PDC base stations 71-1-71-3 and mobile radio units 74-1 and 74-2 and performs switching control with network 76; a plurality of PHS base stations 73-1-73-4 by which mobile radio units 74-1 and 74-2 are connected by way of PHS radio lines (only four base stations are shown in the figure); and PHS exchange 75 connected between PHS base stations 73-1-73-4 and network 76 and that both switches connections between PHS base stations 73-1-73-4 and mobile radio units 74-1 and 74-2 and performs switching control with network 76. Although mobile radios exclusively serviced by these base stations are also present inside the service area of each base station, these have been omitted in the figures.

Service areas 77-1-77-3 and 78-1-78-4 belong to base stations 71-1-71-3 and 73-1-73-4, respectively. Mobile radio unit 74-1 is present inside service area 77-1 of PDC base station 71-1 and service area 78-3 of PHS base station 73-3, and mobile radio unit 74-2 is present inside the service area 77-1 of PDC base station 71-1.

In this case, mobile radio unit 74-1 can receive service from both the PDC system by way of PDC base station 71-1 and the PHS by way of PHS base station 73-3.

Figure 2:
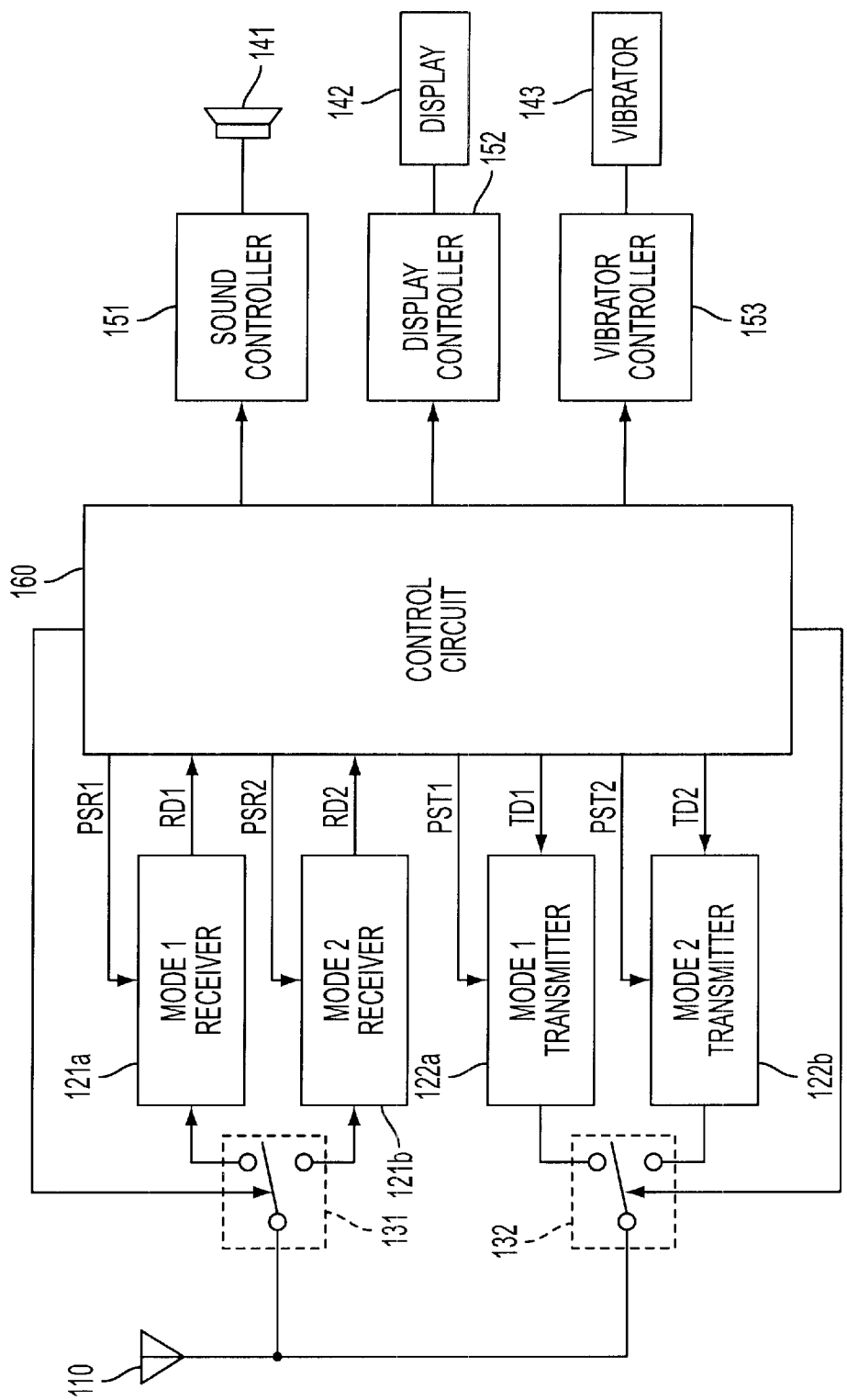
FIG. 2 is a block diagram showing an example of the construction of a multimode mobile radio device that can be used in the areas of FIG. 1.

FIG. 2 is a block diagram showing an example of the construction of a multimode mobile radio unit that is capable of receiving service from both the PDC system and PHS in the area shown in FIG. 1.

As shown in FIG. 2, the multimode radio device of this example is made up of: antenna 110 that transmits and receives radio signals of the two communication modes, i.e., mode 1 and mode 2; mode 1 receiver 121*a* and mode 2 receiver 121*b* that both monitor call incoming in the respectively set mode and receive radio signals received by way of antenna 110 by the respectively set mode upon detecting an incoming call; mode 1 transmitter 122*a* and mode 2 transmitter 122*b* that output signals transmitted by way of antenna 110 in the respectively set mode; switch 131 that switches the connections between antenna 110 and each of mode 1 receiver 121*a* and mode 2 receiver 121*b;* switch 132 that switches connections between antenna 110 and each of mode 1 transmitter 122*a* and mode 2 transmitter 122*b;* to notify of an incoming call when an incoming call is detected at either of mode 1 receiver 121*a* and mode 2 receiver 121*b,* speaker 141 that outputs an incoming call sound, display 142 that notifies by an optical display of a character string or image, and vibrator 143 that generates vibrations; control circuit 160 that controls the operation of switch 131 and switch 132, executes ON/OFF control of the power supplies of mode 1 receiver 121*a* and mode 2 receiver 121*b* as well as of mode 1 transmitter 122a and mode 2 transmitter 122b, that outputs an activation signal for activating speaker 141, display 142, and vibrator 143 upon detecting an incoming call at either one of mode 1 receiver 121a and mode 2 receiver 121b; and, based on the activation signal outputted from control circuit 160, incoming tone control circuit 151 for causing an incoming tone to be outputted from speaker 141, display control circuit 152 for controlling the operation of display 142, and vibrator control circuit 153 for activating vibrator 143. In this example, mode 1 receiver 121a is a PHS mode receiver and mode 2 receiver 121b is a PDC mode receiver.

Figure 3:
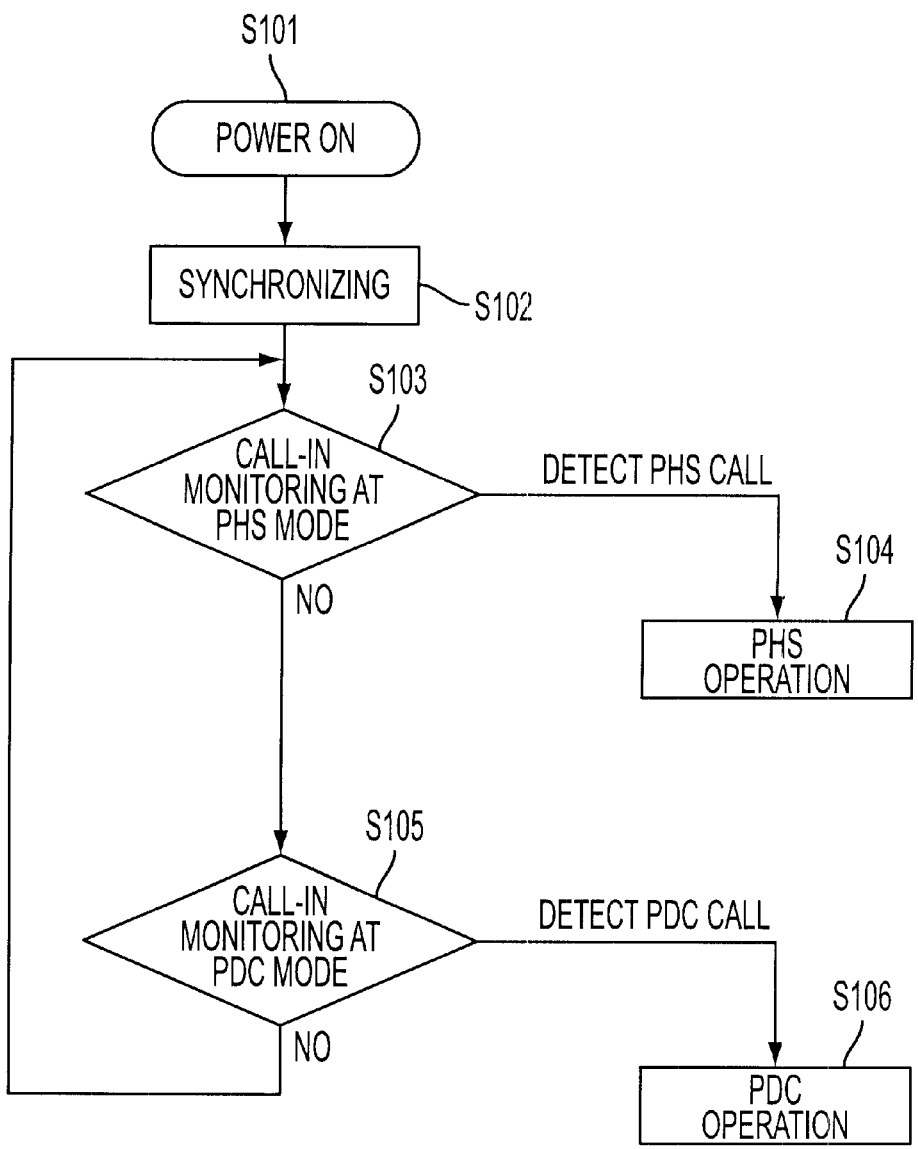
FIG. 3 is a flow chart for explaining the operation of the mobile radio device shown in FIG. 2.

Next, regarding the operation of the mobile radio unit constructed according to the above description, FIG. 3 shows a flow chart for explaining the operation of the mobile radio unit shown in FIG. 2.

When the power supply is turned ON (Step S101), synchronization is first established between the PDC mode and PHS mode (Step S102).

When synchronization is established in Step S102, mode 1 receiver 121a and antenna 110 are connected in accordance with a mode switching signal outputted from control circuit 160, and call incoming is monitored at the timing of PHS mode (Step S103).

When an incoming call is detected in Step S103, notification of call incoming is executed by means of speaker 141, display 142, or vibrator 143, following which PHS operation is performed (Step S104).

If call incoming is not detected in Step S103, mode 2 receiver 121b and antenna 110 are connected in accordance with a mode switching signal outputted from control circuit 160, and call incoming is therefore monitored at the timing of PDC mode (Step S105).

When an incoming call is detected in Step S105, notification of call incoming is executed by means of speaker 141, display 142, or vibrator 143, following which PDC operation is performed (Step S106).

If an incoming call is not detected in Step S105, the process returns to Step S103.

The above-described monitoring of call incoming is carried out at the timing established in each of the PHS mode and PDC mode.

Figure 4:
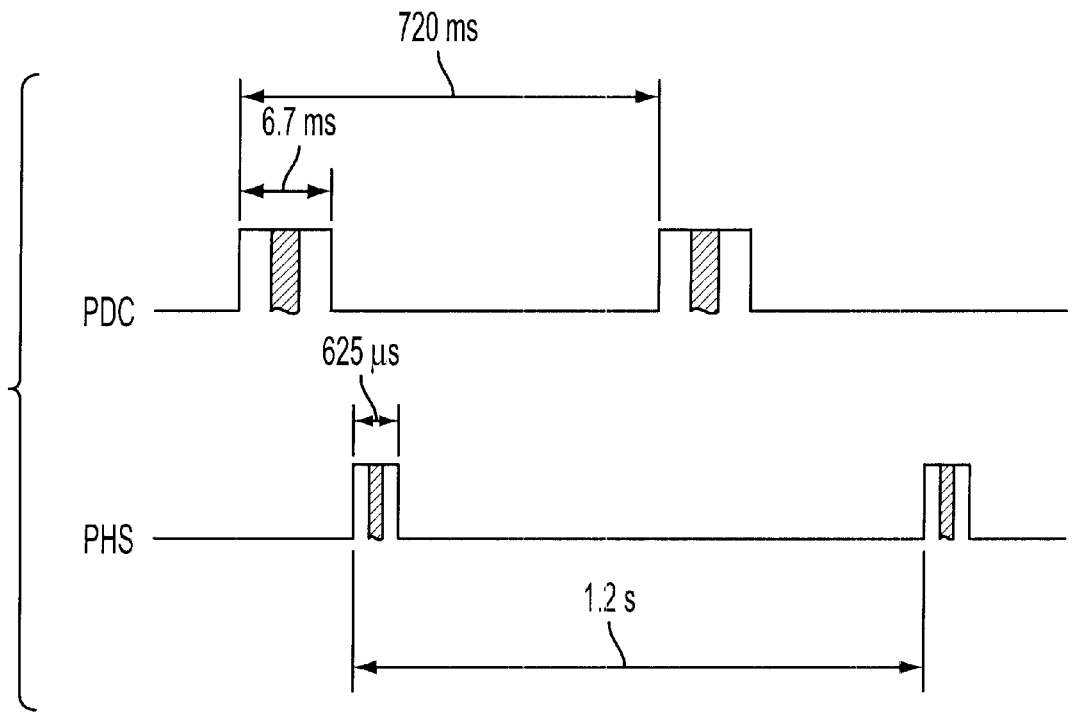
FIG. 4 shows the timing of incoming call monitoring in PHS mode and PDC mode.

FIG. 4 shows the timing of call incoming monitoring in PHS mode and PDC mode.

As shown in FIG. 4, a signal having a width of 6.7 ms is transmitted from the base station every 720 ms in PDC mode, and the signals to each of the mobile radio units are contained within this signal (the shaded portion in the figure). To this end, mode 2 receiver 121b and antenna 110 are connected every 720 ms to monitor whether or not there is an incoming call.

In PHS mode, on the other hand, a signal having a width of 625 μs is transmitted from a base station every 1.2 s, and signals for each of the mobile radio units are contained within this signal (the shaded portion in the figure). To this end, mode 1 receiver 121a and antenna 110 are connected every 1.2 s to monitor whether or not there is an incoming call.

Figure 5:
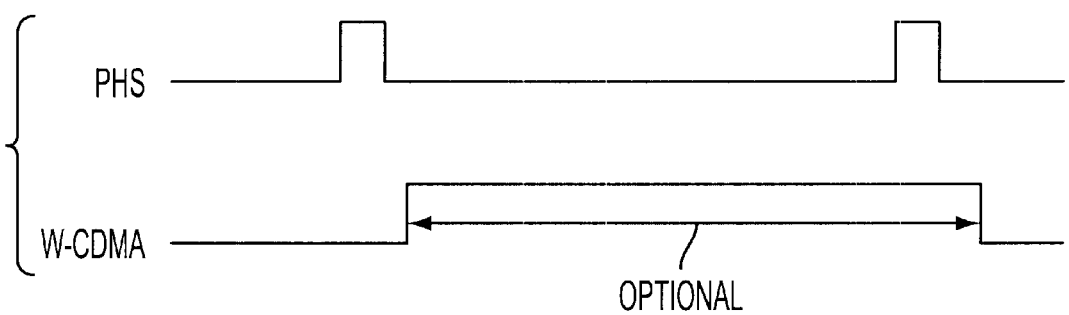
FIG. 5 shows the timing of incoming call monitoring in W-CDMA mode with respect to PHS mode.
Figure 6:
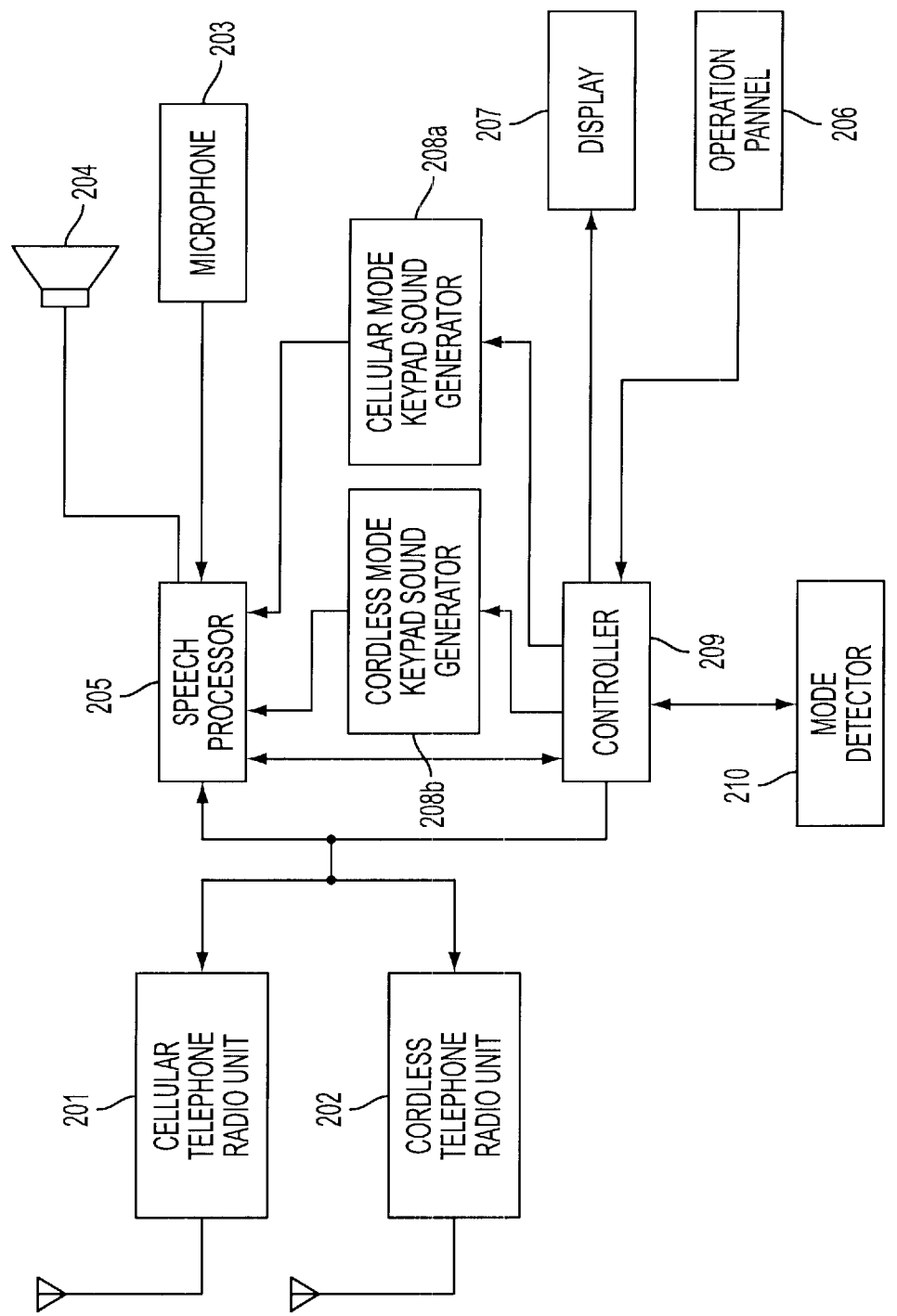
FIG. 6 is a block diagram showing an example of the construction of a multimode mobile radio device of the prior art.

FIG. 5 shows the timing of incoming call monitoring in W-CDMA (Wide-Code Division Multiple Access) for the PHS mode.

As shown in FIG. 5, the timing of call incoming in W-CDMA mode is not determined by time, and the timing of mode setting is therefore determined beforehand, and call incoming is monitored with priority given to the set mode.

A portable telephone that can be used in a plurality of such mobile radio systems or a multimode mobile radio unit having a plurality of modes is therefore provided with a transmitter-receiver for each system and a communication protocol is established for every system and for every communication mode.

A speaker, display, or vibrator is used as the man-machine interface for notifying a user of an incoming call, but if used merely for notifying of an incoming call upon call incoming, only one incoming call notifying means need be set for each terminal unit, and normally, call notifying means are not set individually for each system or communication mode.

In the above-described multimode mobile radio unit of the prior art, notification of a call upon detection of an incoming call is realized by means of a speaker, display, or vibrator in accordance with the notification method set in the terminal device regardless of the system or communication mode of the radio signals of the incoming call.

Explanation is next presented regarding the embodiments of the present invention with reference to the accompanying figures.

Explanation is first presented using three embodiments regarding the mode-specific incoming call notification method in the above-described multimode mobile radio device.

First Embodiment

Figure 7:
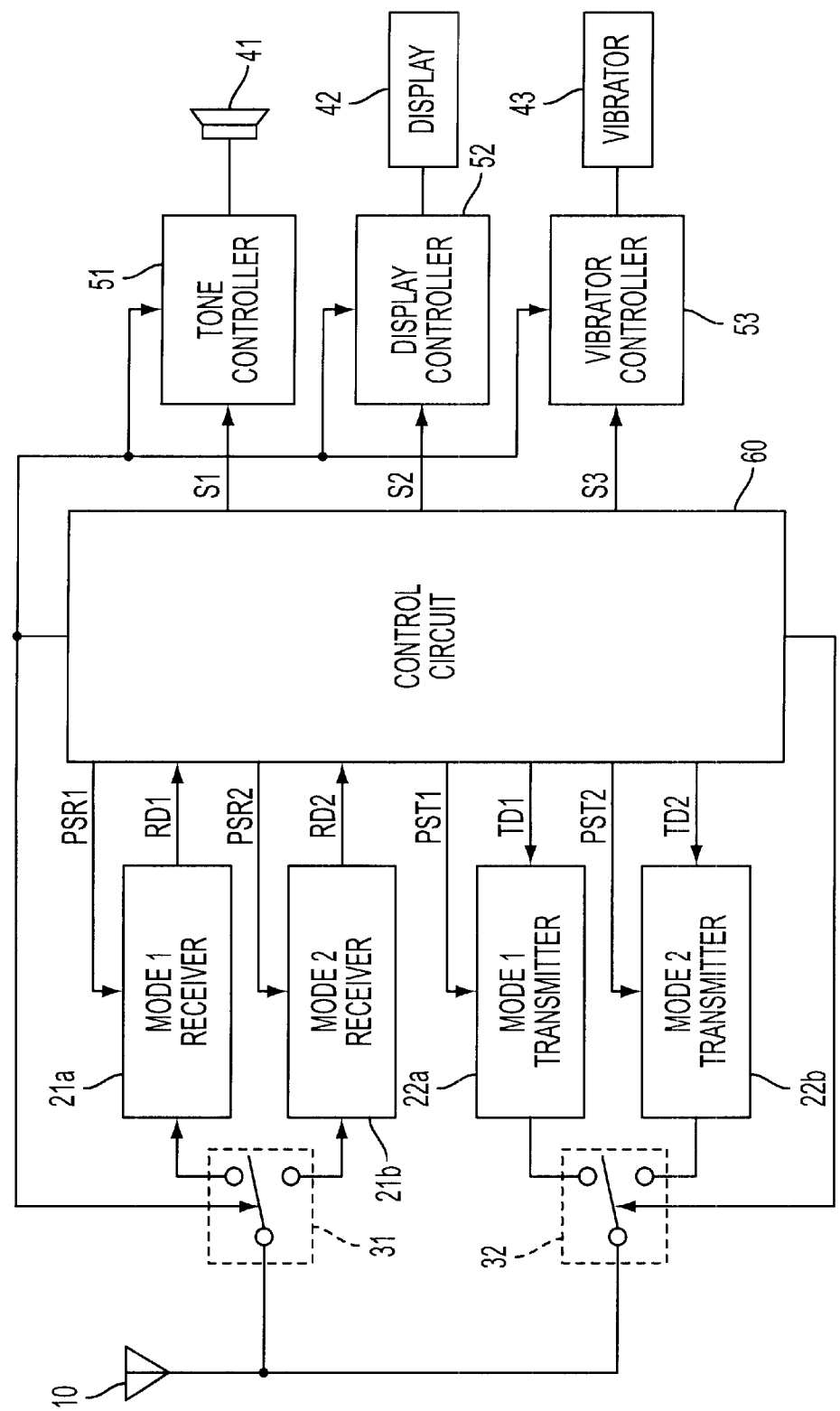
FIG. 7 is a block diagram showing a multimode mobile radio device according to the first embodiment of the present invention.

FIG. 7 is a block diagram showing a multimode mobile radio device according to the first embodiment of the present invention having an incoming call notifying device.

As shown in FIG. 7, this embodiment is made up of: antenna 10 for transmitting and receiving radio signals;

mode 1 receiver 21a and mode 2 receiver 21b for both monitoring call incoming by the respectively set mode and, when an incoming call is detected, receiving the radio signals received by way of antenna 10 by the respectively set mode;

mode 1 transmitter 22a and mode 2 transmitter 22b for outputting signals transmitted by way of antenna 10 by the respectively set mode;

reception switch 31 for switching the connection with antenna 10 between mode 1 receiver 21a and mode 2 receiver 21b;

transmission switch 32 for switching the connection with antenna 10 between mode 1 transmitter 22a and mode 2 transmitter 22b;

speaker 41 for outputting a call incoming sound, display 42 for displaying characters or images, and vibrator 43 for generating vibrations for giving notification of an incoming call if an incoming call is detected at either of mode 1 receiver 21a and mode 2 receiver 21b;

control circuit 60 for controlling the operations of switch 31 and switch 32, for performing ON/OFF control of the power supplies of each of mode 1 receiver 21a and mode 2 receiver 21b as well as of mode 1 transmitter 22a and mode 2 transmitter 22b, and moreover, for both outputting a mode switching signal that indicates the ON/OFF state of the switched mode and outputting an activation signal to activate speaker 41, display 42 and vibrator 43 if an incoming call is detected at either one of mode 1 receiver 21a and mode 2 receiver 21b; and control circuits for each notifier that operate based on the mode switching signals outputted from control circuit 60, i.e., incoming call sound control circuit 51 that controls the type of incoming call sound outputted from speaker 41 and outputs a mode-specific incoming call sound from speaker 41 based on an activation signal, display control circuit 52 that controls the content displayed by display 42 and that causes display 42 to display its content based on an activation signal, and vibrator control circuit 53 that controls the type of vibration pattern or rpm outputted from vibrator 43 and activates vibrator 43 based on an activation signal.

In the multimode mobile radio device of this embodiment, antenna 10, receivers for each mode 21a and 21b, transmitters for each mode 22a and 22b, and switches for each mode 31 and 32 each have substantially the same functions as in the prior art, and the present invention differs from the prior art in that incoming call sound control circuit 51, display control circuit 52, and vibrator control circuit 53 that control the notifiers, i.e., the speaker, display, and vibrator, respectively, effect notification of incoming calls from each notifier by different notification methods that are specific to the mode of the incoming call based on mode switching signals outputted by control circuit 60.

Although mode 1 receiver 21a is a receiver in PHS mode and mode 2 receiver 21b is a receiver in PDC mode in the present embodiment, communication modes other than these are included, and in addition, the receivers may be for a plurality of three or more differing communication modes.

Figure 8:
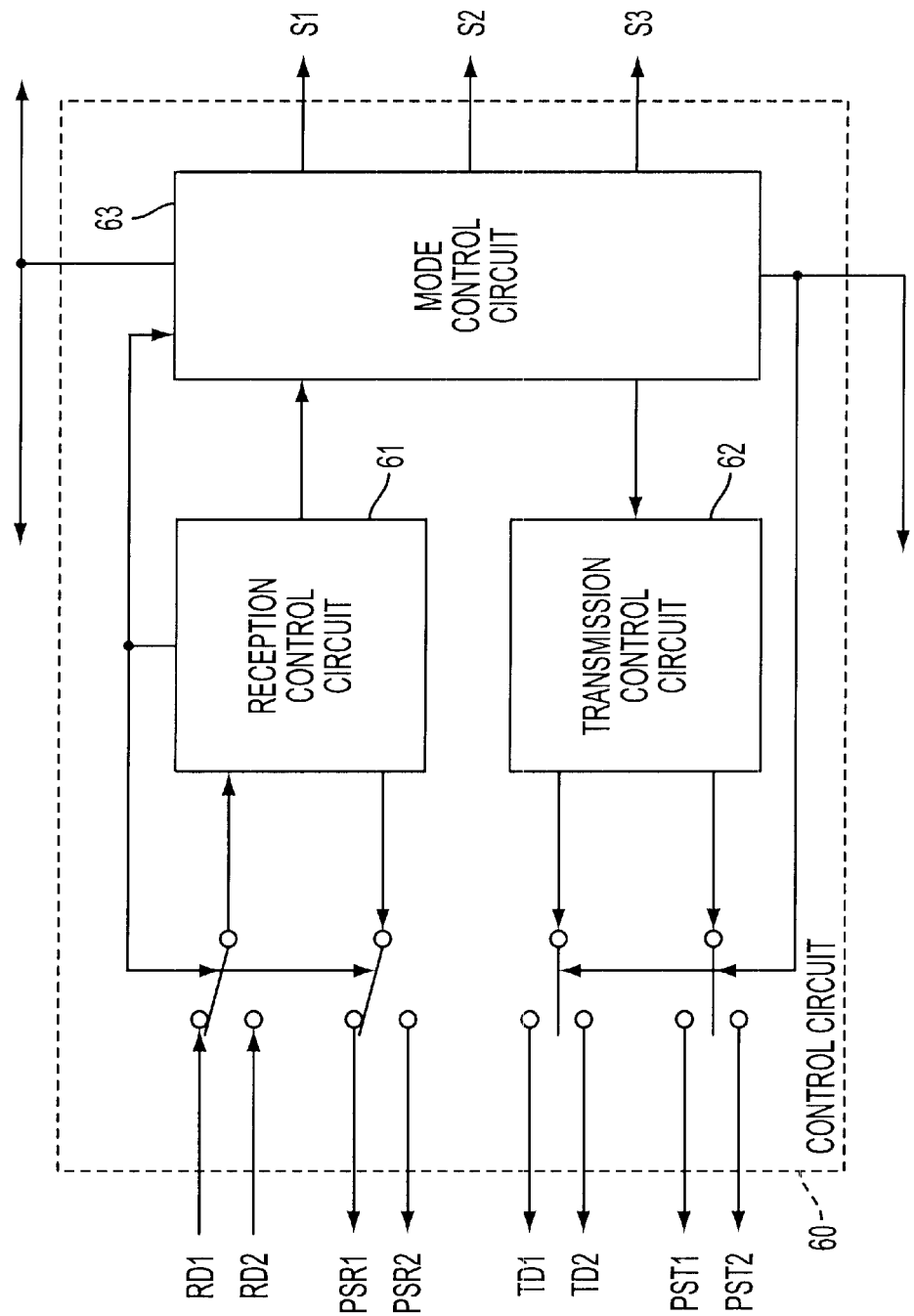
FIG. 8 is a block diagram showing the construction of the control circuit shown in FIG. 7.

As shown in FIG. 8, control circuit 60 is made up of: reception control circuit 61 for both outputting mode discriminating signals for switching reception modes at a predetermined timing and performing ON/OFF control of the power supplies of mode 1 receiver 21a and mode 2 receiver 21b based on radio signals received by way of antenna 10, and for taking in reception data from the mode receiver in which the power supply is set to ON; transmission control circuit 62 for both performing ON/OFF control of the power supplies of mode 1 transmitter 22a and mode 2 transmitter 22b based on radio signals transmitted by way of antenna 10 and outputting transmission signals to the mode transmitter for which the power supply is set to ON; and mode control circuit 63 for both outputting mode switching signals for controlling the operations of switch 31, incoming call sound control circuit 51, display control circuit 52, and vibrator control circuit 53 based on reception mode discriminating signals outputted from reception control circuit 61 and activating incoming call sound control circuit 51, display control circuit 52, and vibrator control circuit 53.

Figure 9:
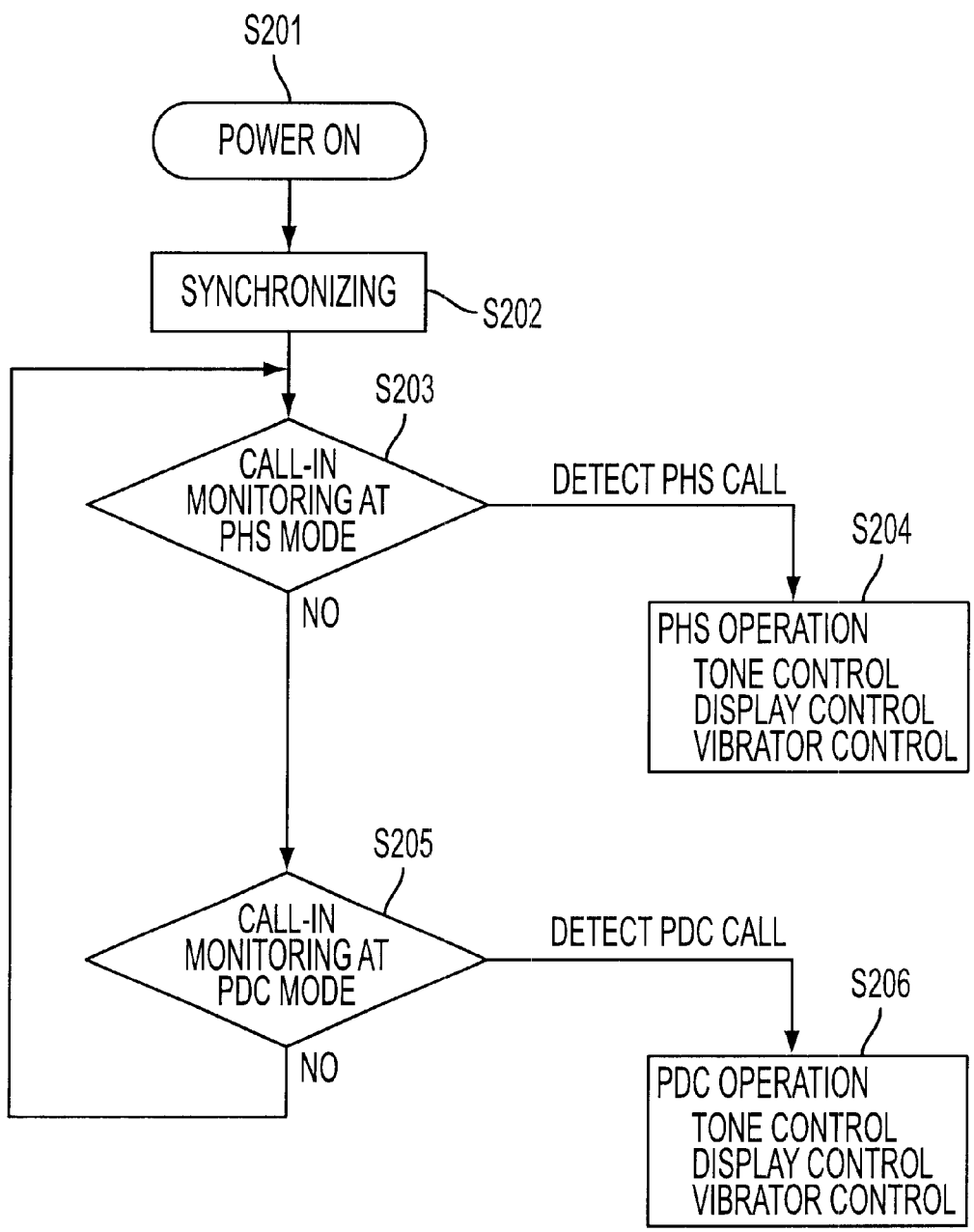
FIG. 9 is a flow chart for explaining the operation of the multimode mobile radio device shown in FIG. 7 and FIG. 8.

Referring to the flow chart of FIG. 9, explanation is next presented regarding the operation of a multimode mobile radio device constructed according to the foregoing description.

When the power supply is turned ON (Step S201), synchronization is first established between PDC mode and PHS mode (Step S202).

When synchronization is established in Step S202, mode 1 receiver 21a and antenna 10 are connected in accordance with a mode switching signal outputted from control circuit 60, and monitoring of call incoming is thus carried out at the timing of the PHS mode (Step S203).

Here, the mode switching signals is also outputted to incoming call sound control circuit 51, display control circuit 52, and vibrator control circuit 53, and based on this mode switching signal, the call incoming sound outputted from speaker 41 is set in incoming call sound control circuit 51, the display content displayed by display 42 is set in display control circuit 52, and the type of vibration pattern and rpm of vibrator 43 is set in vibrator control circuit 53.

When an incoming call is detected in Step S203, the incoming call sound, display content, or vibration pattern set in PHS mode is outputted from speaker 41, display 42, or vibrator 43 to effect notification of call incoming (Step S204).

At the same time, a receiver selecting signal for selecting mode 1 receiver 21a and a receiver power supply control signal for turning ON the power supply of mode 1 receiver 21a are outputted from reception control circuit 61, and in accordance with these signals, reception signals received at mode 1 receiver 21a are taken into reception control circuit 61.

If an incoming call is not detected in Step S203, mode 2 receiver 21b and antenna 10 are connected in accordance with a mode switching signal outputted from control circuit 60, and monitoring of incoming calls is thus carried out at the timing of PDC mode (Step S205).

If an incoming call is detected in Step S205, the incoming call sound, display content, or vibration pattern that is set to PDC mode is outputted from speaker 41, display 42, or vibrator 43 to effect notification of the incoming call (Step S206).

At the same time, a receiver selecting signal for selecting mode 2 receiver 21b and a receiver power supply control signal for turning ON the power supply of mode 2 receiver 21b are outputted from reception control circuit 61, whereby reception signals received by mode 2 receiver 21b are taken into reception control circuit 61.

If an incoming call is not detected in Step S205, processing returns to Step S203.

The monitoring of call incoming described hereinabove is performed at the timing determined in each of PHS mode and PDC mode.

An actual example of the control of mode-specific incoming call sound, display content, and vibration is next described.

Figure 10:
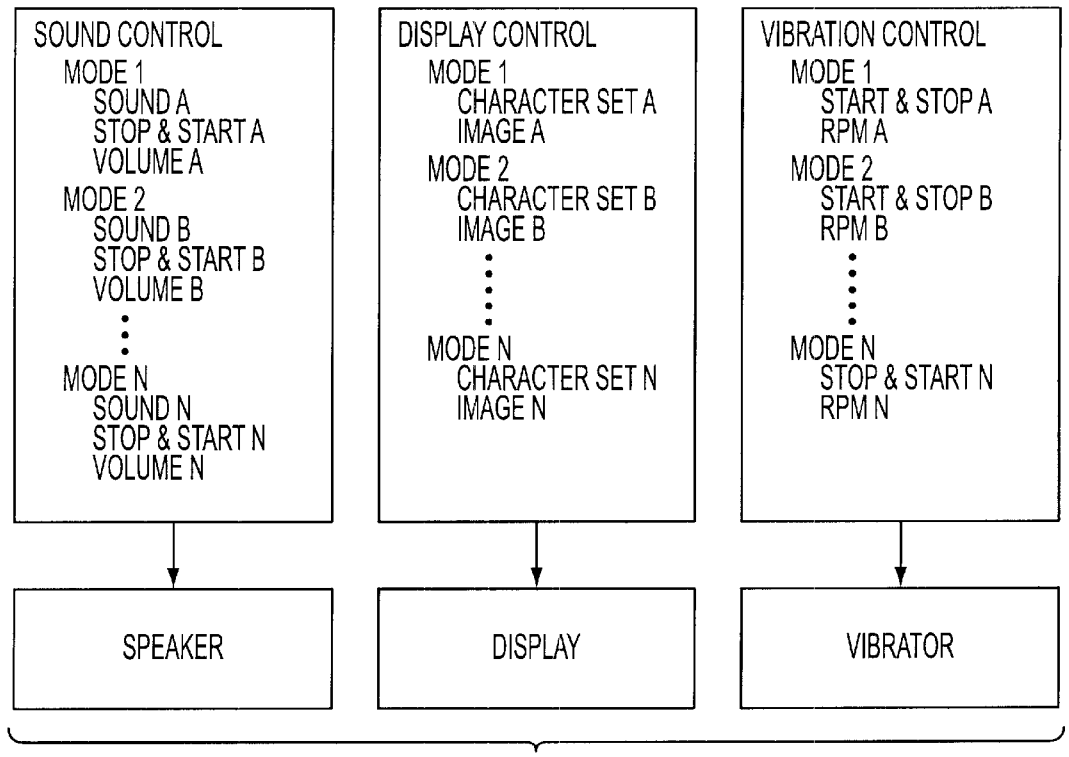
FIG. 10 is for explaining the control of mode-specific incoming call sounds, display content, and vibration the multimode mobile radio device shown in FIG. 7 and FIG. 8.

FIG. 10 is provided for explaining the control of mode-specific incoming call sound, display content, and vibration in the multimode mobile radio device shown in FIG. 7 and FIG. 8.

In incoming call sound control circuit 51, preset incoming call sounds (including, for example, melodies), start-and-stop patterns of sound, or sound volumes are switched based on a mode switching signal outputted from mode control circuit 63.

For example, incoming call sound A, stop-and-start pattern A, and sound volume A are set when mode 1 is set by a mode switching signal, and incoming call sound B, stop-and-start pattern B, and sound volume B are set when set to mode 2. Incoming call activation signal S1 outputted from mode control circuit 63 then causes speaker 41 to output the incoming call sound that has been independently set according to the mode in which call incoming has occurred.

Similarly, display characters or the type of images are set in display control circuit 52 based on a mode switching signal outputted from mode control circuit 63, and display activation signal S2 outputted from mode control circuit 63 causes display 42 to display the display content that has been independently set according to the mode in which call incoming has occurred.

In vibrator control circuit 53 as well, the set vibration pattern or rpm of vibrator 43 is switched based on a mode switching signal outputted from mode control circuit 63, and vibrator activation signal S3 outputted from mode control circuit 63 causes generation of the vibration that has been independently set according to the mode in which call incoming has occurred.

The above-described call incoming sound outputted from speaker 41, display content displayed by display 42, and vibration pattern of vibrator 43 are stored in advance with the address for each mode in the memory of control circuit 60 or incoming call sound control circuit 51, display control circuit 52, and vibrator control circuit 53. When an incoming call is detected, an address is designated according to the reception mode and the stored content is read.

Figure 11:
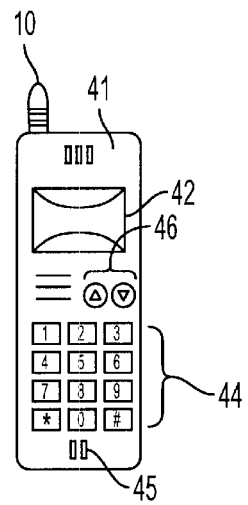
FIG. 11 is an external view of the multimode mobile radio device shown in FIG. 7.

FIG. 11 is an external view of the multimode mobile radio device shown in FIG. 7.

As shown in FIG. 11, in addition to antenna 10, speaker 41, display 42, key buttons 44, and microphone 45, this embodiment is provided with scroll buttons 46 for setting the incoming call sound outputted from speaker 41, the display content that is displayed on display 42, and the vibration pattern of vibrator 43.

When the incoming call sound outputted from speaker 41, the display content displayed on display 42, and the vibration pattern of vibrator 43 are to be set for each mode, the setting mode is first established through operation of key buttons 44, the incoming call sound is outputted from speaker 41, the display content is displayed on display 42, and the vibration pattern is outputted from vibrator 43, following which settings are made for each mode by selecting the outputted content by means of scroll buttons 46.

When waiting for an incoming call in this embodiment, the mode of mode 1 receiver 21a and the mode of mode 2 receiver 21b are alternately set for each predetermined timing to monitor whether or not there has been an incoming call of each of the modes of mode 1 receiver 21a and mode 2 receiver 21b, but one mode may also be fixed in advance in control circuit 60.

Finally, although explanation was presented in this embodiment regarding the switching between the modes in two mobile radio systems, PDC and PHS, the present invention is not limited to this form, and switching may be effected between modes of a plurality of other radio systems.

Second Embodiment

Although the mode of mode 1 receiver 21a and the mode of mode 2 receiver 21b are set to switch at each predetermined timing during incoming call waiting and the incoming call notification method changes based on this setting in the above-described first embodiment, the incoming call notification method may also be changed at an unspecified time based on the received radio signals at the time of call incoming.

Figure 12:
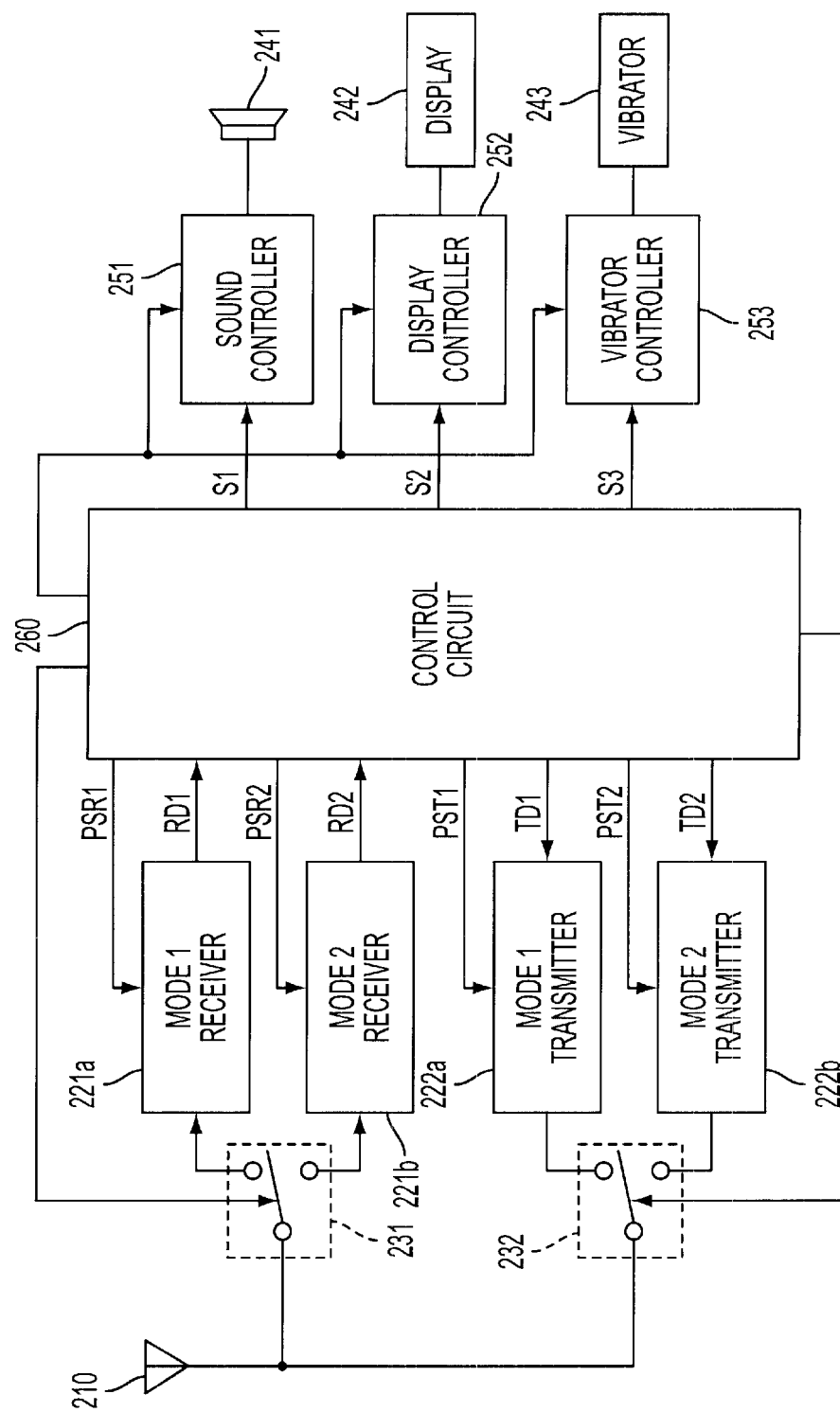
FIG. 12 is a block diagram showing a multimode mobile radio device according to the second embodiment of the present invention.

FIG. 12 is a block diagram showing the multimode mobile radio device according to the second embodiment of the present invention.

As shown in FIG. 12, this second embodiment is made up of: antenna 210, mode 1 receiver 221a and mode 2 receiver 221b, mode 1 transmitter 222a and mode 2 transmitter 222b, receiver switch 231, transmitter switch 232, speaker 241, display 242, vibrator 243, incoming call sound control circuit 251, display control circuit 252, vibrator control circuit 253, and control circuit 260;

and of these circuits, any of the circuits for controlling the notifiers, i.e., incoming call sound control circuit 251 for controlling the type of incoming call sound outputted from speaker 241, display control circuit 252 for controlling the content displayed by display 242, and vibrator control circuit 253 for controlling the type of vibration pattern or rpm outputted from vibrator 243, controls the type of incoming call sound outputted from speaker 241, the content that is displayed on display 242, or the type of vibration pattern or rpm that is outputted from vibrator 243, respectively, when radio signals are received in either of mode 1 receiver 221a and mode 2 receiver 221b, based on the received radio signals.

In addition, control circuit 260 both controls the operation of switch 231 and switch 232 and performs ON/OFF control of the power supplies of mode 1 receiver 221a and mode 2 receiver 221b as well as of mode 1 transmitter 222a and mode 2 transmitter 222b, and moreover, controls the operations of incoming call sound control circuit 251, display control circuit 252, and vibrator control circuit 253 when radio signals are received by either of mode 1 receiver 221a and mode 2 receiver 221b based on the received radio signals.

In this embodiment as well, mode 1 receiver 221a is the PHS mode receiver and mode 2 receiver 221b is the PDC mode receiver.

Figure 13:
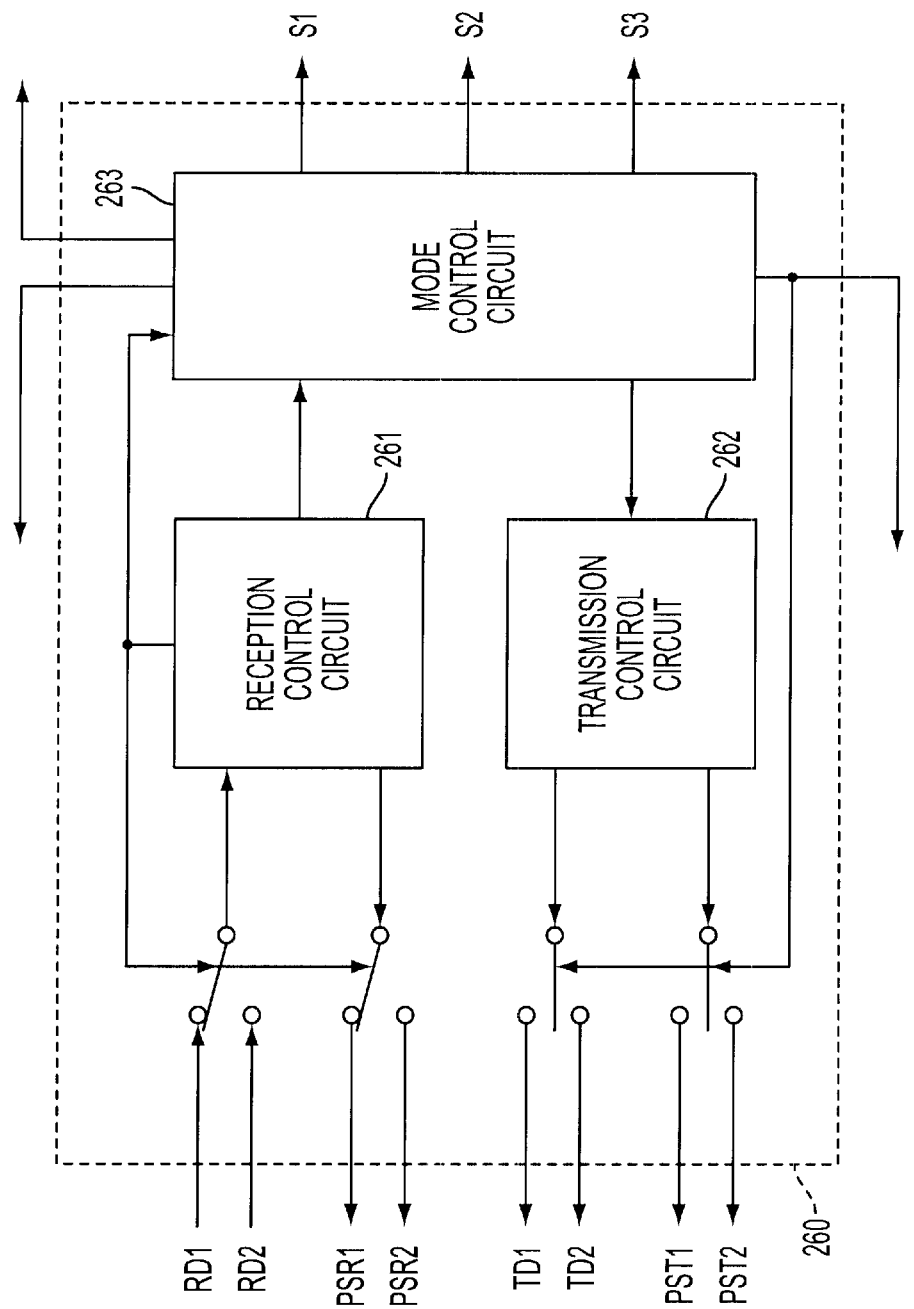
FIG. 13 is a block diagram showing the construction of the control circuit shown in FIG. 12.

FIG. 13 is a block diagram showing the construction of control circuit 260 shown in FIG. 12.

As shown in FIG. 13, control circuit 260 in this embodiment is made up of: reception control circuit 261 for both performing ON/OFF control of the power supplies of mode 1 receiver 221a and mode 2 receiver 221b based on the received radio signals and taking in reception data from the mode receiver for which the power supply has been set to ON; transmission control circuit 262 for both effecting ON/OFF control of the power supplies of mode 1 transmitter 222a and mode 2 transmitter 222b based on the radio signals transmitted by way of antenna 210 and outputting transmission signals to the mode transmitter for which the power supply has been set to ON; and mode control circuit 263 for switching the mode in incoming call sound control circuit 251, display control circuit 252, and vibrator control circuit 253 based on the radio signals received by way of antenna 210 and for activating these circuits.

Explanation is next presented regarding the operation of the multimode mobile radio device constructed according to the foregoing description.

Figure 14:
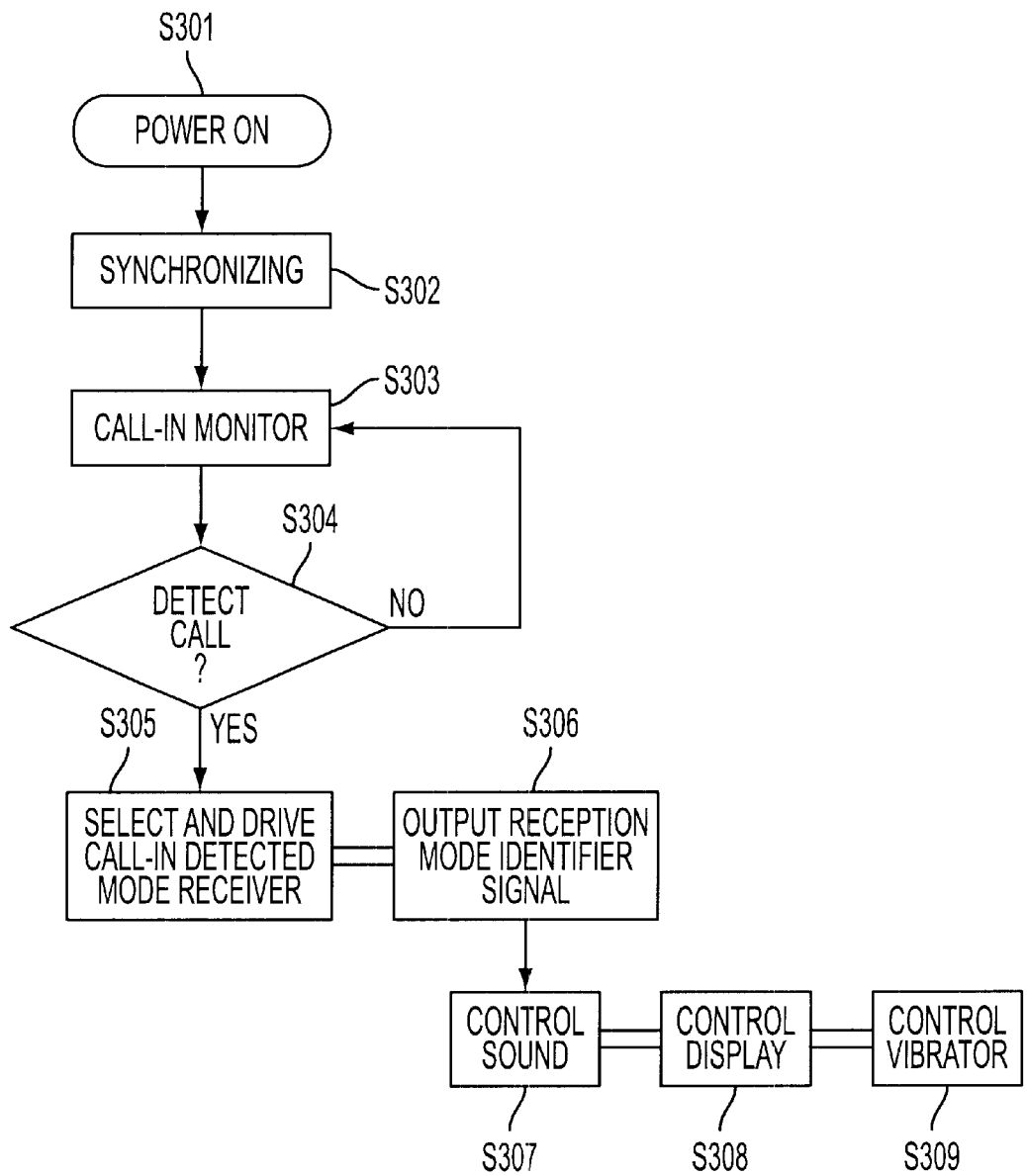
FIG. 14 is a flow chart for explaining the operation of the multimode mobile radio device shown in FIG. 12 and FIG. 13.

FIG. 14 is a flow chart for explaining the operation of the multimode mobile radio device shown in FIG. 12 and FIG. 13.

When the power supply is turned ON (Step S301), synchronization is first established between the PDC mode and PHS mode (Step S302).

After synchronization is established in Step S302, reception control circuit 261 outputs a receiver selecting signal by which, of mode 1 receiver 221a and mode 2 receiver 221b, mode 1 receiver 221a is selected, and a receiver power supply control signal for turning ON the power supply of mode 1 receiver 221a. Reception control circuit 261 therefore takes in reception signals received by mode 1 receiver 221a.

Reception control circuit 261 then outputs a receiver selecting signal by which mode 2 receiver 221b is selected and a receiver power supply control signal for turning ON the power supply of mode 2 receiver 221b. Reception control circuit 261 therefore takes in reception signals received by mode 2 receiver 221b.

The above-described operations are performed at every particular fixed timing by means of a timer (not shown in the figures) provided inside reception control circuit 261, whereby monitoring is carried out to check whether or not there has been an incoming call by the mode of mode 1 receiver 221a or mode 2 receiver 221b (Step S303).

If an incoming call in the mode of mode 1 receiver 221a is detected in Step S303 (Step S304), reception control circuit 261 outputs a receiver selecting signal by which mode 1 receiver 221a is selected and a receiver power supply control signal for turning ON the power supply of mode 1 receiver 221a, and reception control circuit 261 therefore takes in reception signals received by mode 1 receiver 221a (Step S305).

At the same time, a reception mode identifier signal showing the mode in which call incoming occurred is outputted from reception control circuit 261 to mode control circuit 263 (Step S306).

When the received mode identifier signal outputted from reception control circuit 261 is received by mode control circuit 263, a mode switching signal based on the received mode identifier signal for switching the mode in incoming call sound control circuit 251, display control circuit 252, and vibrator control circuit 253 is outputted from mode control circuit 263 to incoming call sound control circuit 251, display control circuit 252, and vibrator control circuit 253.

In incoming call sound control circuit 251, the incoming call sound to be outputted from speaker 241 is controlled according to the mode in which the incoming call occurred, and the incoming call sound is outputted by way of speaker 241 (Step S307).

In display control circuit 252 as well, the content to be displayed in display 242 is controlled according to the mode of the incoming call, and display indicating the incoming call is executed by way of display 242 (Step S308).

Finally, in vibrator control circuit 253, the vibration pattern or rpm in vibrator 243 is controlled according to the mode of the incoming call, and vibration is generated by vibrator 243 (Step S309).

Mode control circuit 263 simultaneously outputs a mode switching signal to incoming call sound control circuit 251, display control circuit 252, and vibrator control circuit 253 and outputs a mode switching signal based on the reception mode identifier signal for switching operations to switches 231 and 232.

Third Embodiment

In the first embodiment described hereinabove, the timing of the output of mode switching signals from control circuit 60 to switches 31 and 32 coincides with the timing of the output of the mode switching signal from control circuit 60 to incoming call sound control circuit 51, display control circuit 52, and vibrator control circuit 53, but a form may be considered in which the output of the mode switching signal from control circuit 60 to incoming call sound control circuit 51, display control circuit 52, and vibrator control circuit 53 comes after the operation of switch 31 and the stabilization of the operation of mode 1 receiver 21a and mode 2 receiver 21b.

Figure 15:
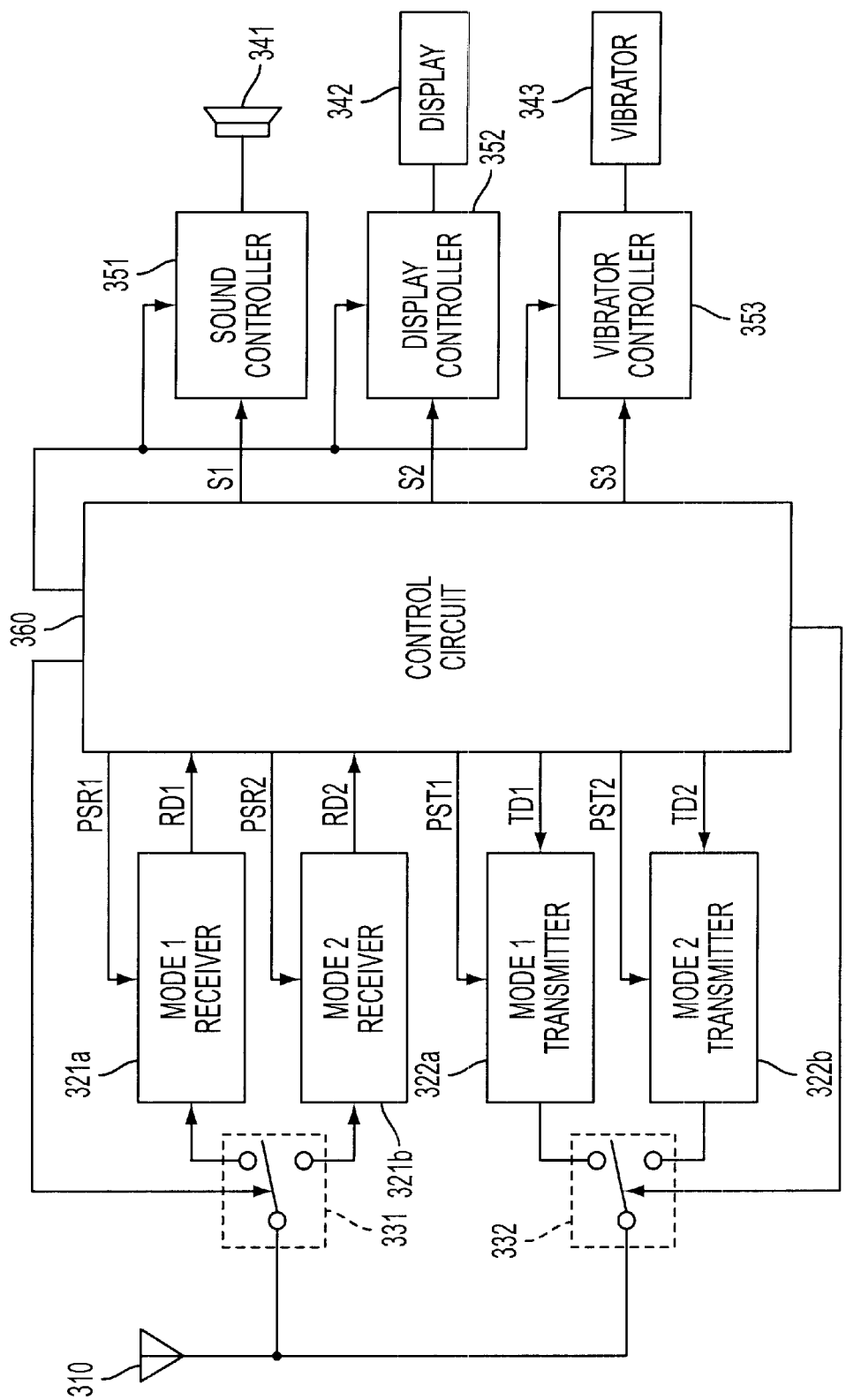
FIG. 15 is a block diagram showing the multimode mobile radio device according to the third embodiment of the present invention.

FIG. 15 is a block diagram showing the multimode mobile radio device according to the third embodiment of the present invention.

As shown in FIG. 15, the multimode mobile radio device according to this embodiment is made up of: antenna 310, mode 1 receiver 321a and mode 2 receiver 321b, mode 1 transmitter 322a and mode 2 transmitter 322b, switch 331, switch 332, speaker 341, display 342, vibrator 343, control circuit 360, incoming call sound control circuit 351, display control circuit 352, and vibrator control circuit 353.

Control circuit 360 both controls the operation of switch 331 and switch 332 and performs ON/OFF control of the power supplies of mode 1 receiver 321a and mode 2 receiver 321b as well as of mode 1 transmitter 322a and mode 2 transmitter 322b, and in addition, both outputs a mode switching signal that indicates the ON/OFF states of the switched modes and, when an incoming call in either one of mode 1 receiver 321a and mode 2 receiver 321b is detected, outputs an activation signal for activating speaker 341, display 342, and vibrator 343.

Based on the mode switching signal outputted from control circuit 360, incoming call sound control circuit 351, display control circuit 352, and vibrator control circuit 353 respectively control the type of incoming call sound outputted from speaker 341, the content displayed by display 342, and the type of vibration pattern or rpm outputted from vibrator 343, and based on an activation signal, activates the incoming call sound outputted from speaker 341, operates display 342, or activates vibrator 343.

Figure 16:
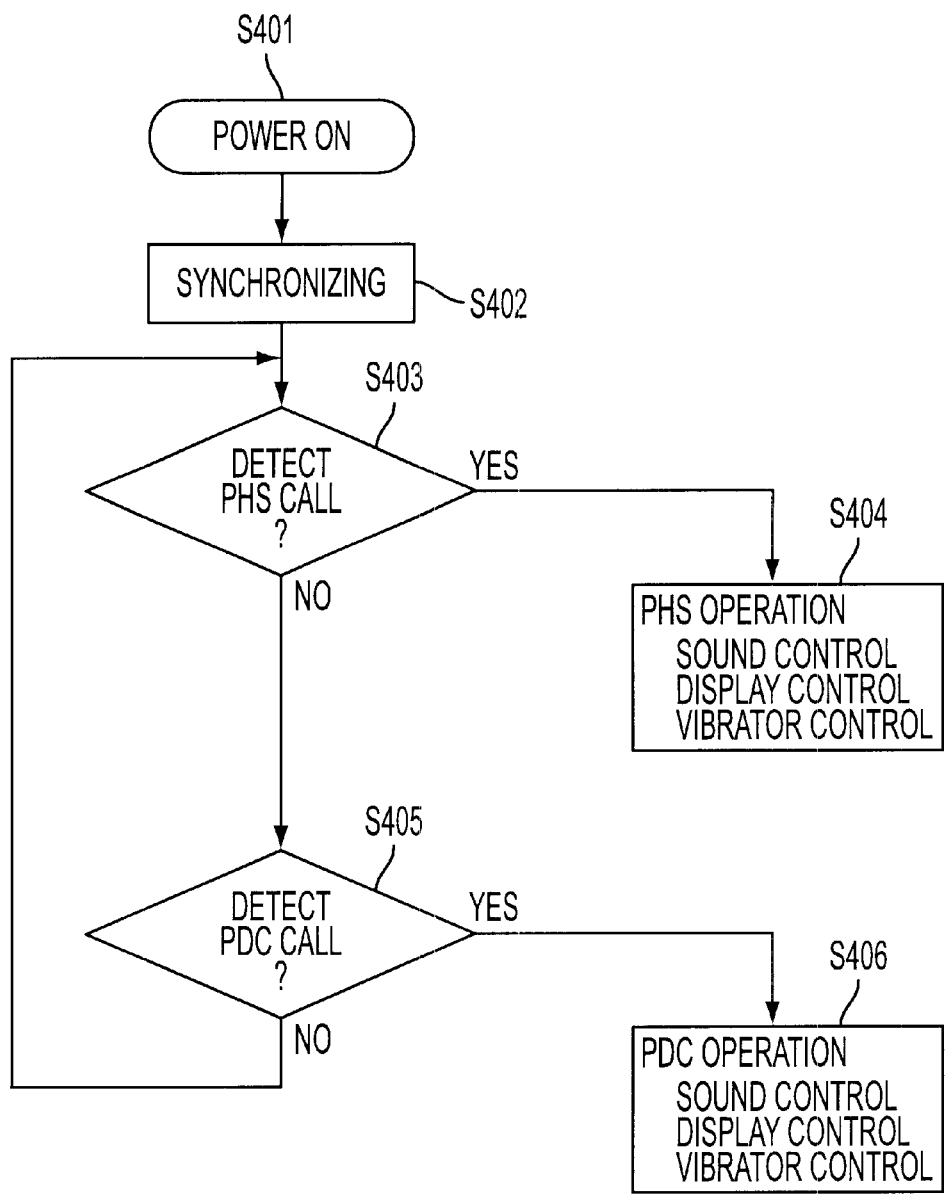
FIG. 16 is a flow chart for explaining the operation of the multimode mobile radio device shown in FIG. 15.

In this embodiment, mode 1 receiver 321a is a receiver in PHS mode, and mode 2 receiver 321b is a receiver in PDC mode. The operation of the multimode mobile radio device of the above-described construction is next described. FIG. 16 is a flow chart for explaining the operation of the multimode mobile radio device shown in FIG. 15.

When the power supply is turned ON (Step S401), synchronization is first established between PDC mode and PHS mode (Step S402).

When synchronization is established in Step S402, mode 1 receiver 321a and antenna 310 are connected by a mode switching signal outputted from control circuit 360, and call incoming is monitored at the timing of PHS mode (Step S403). Here, after mode 1 receiver 321a and antenna 310 are connected in accordance with the mode switching signal outputted from control circuit 360 to incoming call sound control circuit 351, display control circuit 352, and vibrator control circuit 353, a mode switching signal is outputted from control circuit 360 after the passage of a fixed time interval in which the operation of mode 1 receiver 321a stabilizes, and based on this mode switching signal, the incoming call sound that is outputted from speaker 341 is set in incoming call sound control circuit 351, the display content that is displayed on display 342 is set in display control circuit 352, and the type of vibration pattern or rpm of vibrator 343 is set in vibrator control circuit 353.

When an incoming call is detected in Step S403, the incoming call sound, display content, or vibration pattern set to PHS mode is outputted in speaker 341, display 342, or vibrator 343 to effect notification of the incoming call (Step S404).

If an incoming call is not detected in Step S403, mode 2 receiver 321b and antenna 310 are connected in accordance with a mode switching signal outputted from control circuit 360, and call incoming is then monitored at the timing of PDC mode (Step S405). Here, after mode 2 receiver 321b and antenna 310 are connected in accordance with the mode switching signal outputted from control circuit 360 to incoming call control circuit 351, display control circuit 352, and vibrator control circuit 353, a mode switching signal is outputted from control circuit 360 after the passage of a fixed time interval in which the operation of mode 2 receiver 321b stabilizes, and based on this mode switching signal, the incoming call sound that is outputted from speaker 341 is set in incoming call sound control circuit 351, the content that is displayed on display 342 is set in display control circuit 352, and the type of vibration pattern or rpm of vibrator 343 is set in vibrator control circuit 353.

When an incoming call is detected in Step S405, the incoming call sound, display content, or the vibration pattern that is set to PDC mode is outputted in speaker 341, display 342, or vibrator 343 to effect notification of the incoming call (Step S406).

If an incoming call is not detected in Step S405, the process returns to Step S403.

The above-described incoming call monitoring is carried out at the timing determined for each of PHS mode and PDC mode.

Fourth Embodiment

Because telephone numbers differ for each mode in the above-described multimode mobile radio device, the user can notify telephone numbers of different modes according to the caller to whom the telephone number is notified.

In addition, by means of the incoming call sound, display content, or the type of vibration pattern, a user can identify a caller and then choose to not respond to the call. However, if the user does not respond to a call, the incoming call sound will continue as long as the caller continues the call, and this may be inconvenient for the user.

Accordingly, the user may set in advance incoming call notification for only specific modes, and if an incoming call is detected in another mode, the receiver of that mode does not operate, the incoming call information such as a message may be automatically connected to a recording circuit such as an answering machine service, and the message recorded.

Fifth Embodiment

In a case in which one of the plurality of mobile radio systems is a portable telephone system (corresponding to mode 1) and another system is a pager system (corresponding to mode 2), the pager is not provided with a transmitter and therefore does not require a mode switching signal for transmission, but the form shown in FIG. 7 may otherwise be applied.

Although explanation has related to multimode mobile radio devices in the above-described five embodiments, it goes without saying that the present invention may also be applied to a stationary multimode radio device.

It is to be understood that variations and modifications of the multimode mobile radio device disclosed herein will be evident to those skilled in the art. It is intended that all such modifications and variations be included within the scope of the appended claims.

What is claimed is:

1. An incoming call notification method of a multimode radio device, comprising:

assigning a different incoming call notification method in advance to each of a plurality of communication modes;

detecting an incoming call sent by way of radio signals to the address of the multimode radio device;

identifying a communication mode of the plurality of communication modes for the detected incoming call;

switching incoming call notification methods according to the identified communication mode;

establishing synchronization for each mode of the plurality of communication modes when the multimode radio device is activated, and then performing the detecting in a prescribed order according to timing of each communication mode;

if an incoming call is detected, effecting notification and reception of the incoming call by the assigned incoming call notification method of the identified communication mode;

if an incoming call is not detected, monitoring call incoming according to a timing of a next communication mode of the prescribed order; and repeating the detecting and incoming call notification for each communication mode.

2. An incoming call notifying multimode radio device comprising:

an antenna for receiving radio signals of a prescribed plurality of communication modes;

a plurality of receivers that correspond to said plurality of communication modes, each receiver for detecting and then converting radio signals corresponding to the receiver's mode and received by said antenna to output signals;

an incoming call notifying unit including a plurality of expressing configurations that have a one-to-one correspondence to said plurality of communication modes, each of said plurality of expressing configurations being operative to uniquely identify a respective one of the plurality of communication modes that is being used when a call signal, of the radio signals, sent to said multimode radio device has been detected by said plurality of receivers; and a control unit for detecting a receiver of said plurality of receivers that has received the call signal, and controlling the unique identifying operation of said expressing configurations of said incoming call notifying unit in accordance with a corresponding communication mode set in the detected receiver.

3. A device according to claim 2, wherein said control unit identifies communication modes based on received radio signals.

4. A device according to claim 2, wherein said control unit identifies communication modes based on mode setting information of received radio signals.

5. A device according to claim 2, wherein said incoming call notifying unit includes a speaker that generates an incoming call sound that differs for each communication mode of said plurality of communication modes.

6. A device according to claim 2, wherein said incoming call notifying unit includes a speaker that generates an incoming call sound in which at least one of musical interval, stop-and-start pattern, and sound volume differs for each communication mode.

7. A device according to claim 2, wherein said incoming call notifying unit includes a display that optically displays different visual displays that uniquely identify each communication mode of said plurality of communication modes.

8. A device according to claim 7, wherein the display optically displays a different character string or image that distinguishes each communication mode.

9. A device according to claim 2, wherein said incoming call notifying unit includes a vibrator that generates a vibration that is varied for each communication mode of said plurality of communication modes.

10. A device according to claim 9, wherein the vibrator generates a vibration in which at least one of a start-and-stop pattern, amplitude, and rpm is varied for each communication mode.

11. A device according to claim 2, wherein only communication modes prescribed in advance are set for the unique identifying, and wherein, when an incoming call in a communication mode that is different from the prescribed communication modes is detected, said incoming call notification unit does not operate and incoming call information is automatically recorded.

12. An incoming call notifying multimode radio device according to claim 2, wherein operating times of said plurality of receivers are switched at a prescribed timing.

13. An incoming call notifying multimode radio device according to claim 2, wherein an expressing configuration of said incoming call notifying unit is switched after the passage of a predetermined time interval after operation of a corresponding one of said plurality of receivers is switched.

14. An incoming call notifying multimode radio device, comprising:

an antenna for transmitting and receiving radio signals of a prescribed plurality of communication modes;

a plurality of receivers for converting radio signals received by said antenna to signals for each of communication modes that have been set independent of each other and outputting the signals for each of the communication modes;

an incoming call notifying unit including a plurality of expressing configurations that correspond to said plurality of communication modes, each of the plurality of expressing configurations being operative to distinguish and uniquely identify each corresponding one of said communication modes, for reporting when a call signal to the address of said multimode radio device has been detected; and a control unit for controlling operations of said plurality of receivers and incoming call notifying unit, detecting a receiver of said plurality of receivers that has received the call signal, and controlling a corresponding expressing configuration of said incoming call notifying unit in accordance with a communication mode corresponding to the detected receiver;

wherein operating times of said plurality of receivers are switched at a prescribed timing, and wherein said plurality of expressing configurations of said incoming call notifying unit are switched in synchronization with the timing of switching of said receivers.

15. An incoming call notifying multimode radio device, comprising:

an antenna for transmitting and receiving radio signals of a prescribed plurality of communication modes;

a plurality of receivers that correspond to said plurality of communication modes, said receivers for converting radio signals received by said antenna to signals for each of communication modes that have been set independent of each other and outputting the signals for each of the communication modes;

an incoming call notifying unit including a plurality of expressing configurations that correspond to said plurality of communication modes, each of the plurality of expressing configurations being operative to distinguish and uniquely identify each corresponding one of said communication modes, for reporting when a call signal to the address of said multimode radio device has been detected; and a control unit for controlling operations of said plurality of receivers and incoming call notifying unit, detecting a receiver of said plurality of receivers that has received the call signal, and controlling a corresponding expressing configuration of said incoming call notifying unit in accordance with a communication mode corresponding to the detected receiver;

wherein operating times of said plurality of receivers are switched at a prescribed timing, and wherein an expressing configuration of said incoming call notifying unit is switched after the passage of a predetermined time interval after operation of a corresponding one of said plurality of receivers is switched.

16. An incoming call notification method of a multimode radio device, comprising:

assigning a different incoming call notification method in advance to each communication mode of a plurality of communication modes;

detecting an incoming call sent by way of radio signals to the address of the multimode radio device, the detecting of an incoming call being performed during predetermined time periods corresponding to the plurality of communication modes;

identifying a communication mode of the plurality of communication modes for the detected incoming call at a time of the detecting; and switching incoming call notification methods according to the identified communication mode; further comprising establishing synchronization for each mode of the plurality of communication modes when the multimode radio device is activated; and after the establishing of synchronization, performing the detecting in a prescribed order according to timing of each communication mode.

17. An incoming call notification method according to claim 16, wherein if an incoming call is not detected in a current detecting of the prescribed order, monitoring call incoming according to a timing of a next communication mode of the prescribed order.

18. An incoming call notification method of a multimode radio device, comprising:

assigning a different incoming call notification method in advance to each communication mode of a plurality of communication modes;

detecting an incoming call sent by way of radio signals to the address of the multimode radio device, the detecting of an incoming call being performed during predetermined time periods corresponding to the plurality of communication modes;

identifying a communication mode of the plurality of communication modes for the detected incoming call at a time of the detecting; and switching incoming call notification methods according to the identified communication mode; further comprising establishing synchronization for each mode of the plurality of communication modes when the multimode radio device is activated; and cyclically repeating the prescribed order.

19. An incoming call notification method according to claim 18, further comprising notifying a user according to an incoming call notification method assigned to the identified communication mode.

20. In an incoming call notifying multimode radio device comprising an antenna for transmitting and receiving radio signals of a prescribed plurality of communication modes and a plurality of receivers that correspond to said plurality of communication modes, a method comprising controlling an incoming call notifying device according to a current mode of said plurality of communications modes, said current mode being a communication mode of an incoming call being received during a predetermined time period for a predetermined one of said plurality of receivers; and wherein said plurality of expressing configurations of said incoming call notifying unit are switched in synchronization with the timing of switching of said receivers.

* * * * *